Dec. 20, 1927.
H. G. BARTHOLOMEW ET AL
1,653,425
TELAUTOGRAPHY
Filed July 3, 1922
6 Sheets-Sheet 3
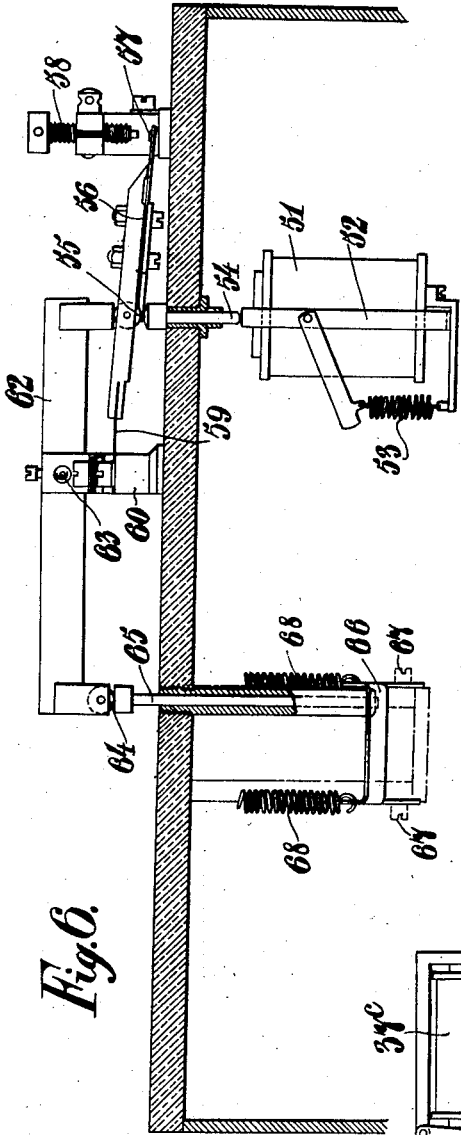
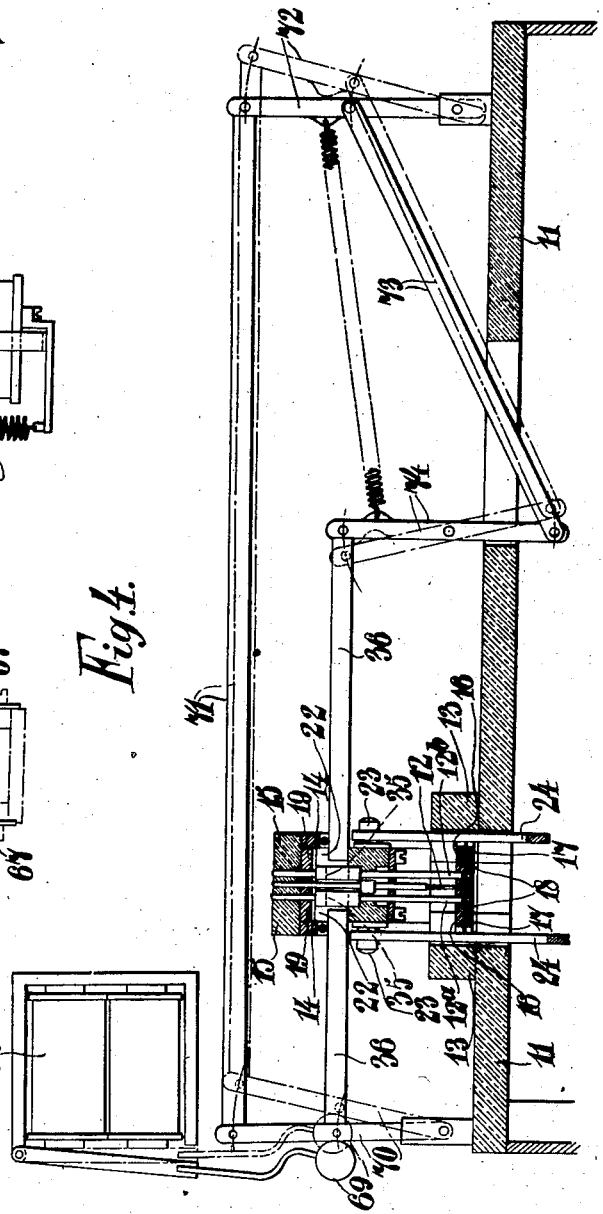
Inventors.
H. Bartholomew
M. McFarlane
By Marker Clerk
Atty's Dec. 20, 1927.
H. G. BARTHOLOMEW ET AL
1,653,425
TELAUTOGRAPHY
Filed July 3, 1922
6 Sheets-Sheet 4
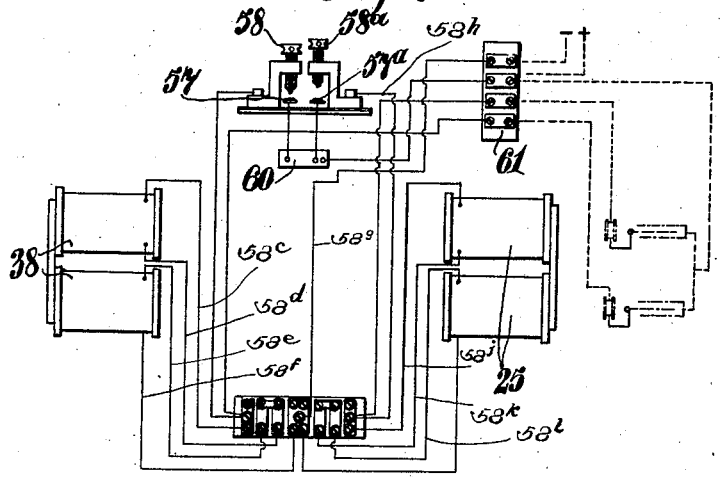
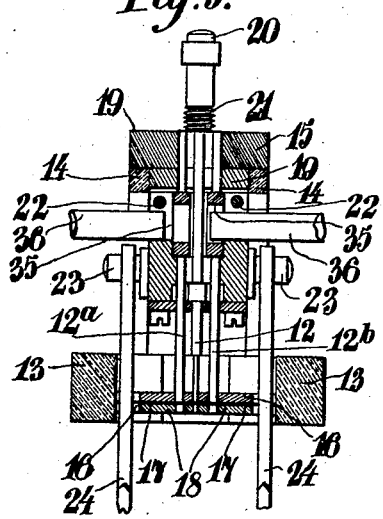
Inventors
H. Bartholomew
M. McFarlane
By Marker Clerk
Atty's Dec. 20, 1927.
H. G. BARTHOLOMEW ET AL
1,653,425
TELAUTOGRAPHY
Filed July 3, 1922      6 Sheets-Sheet 5
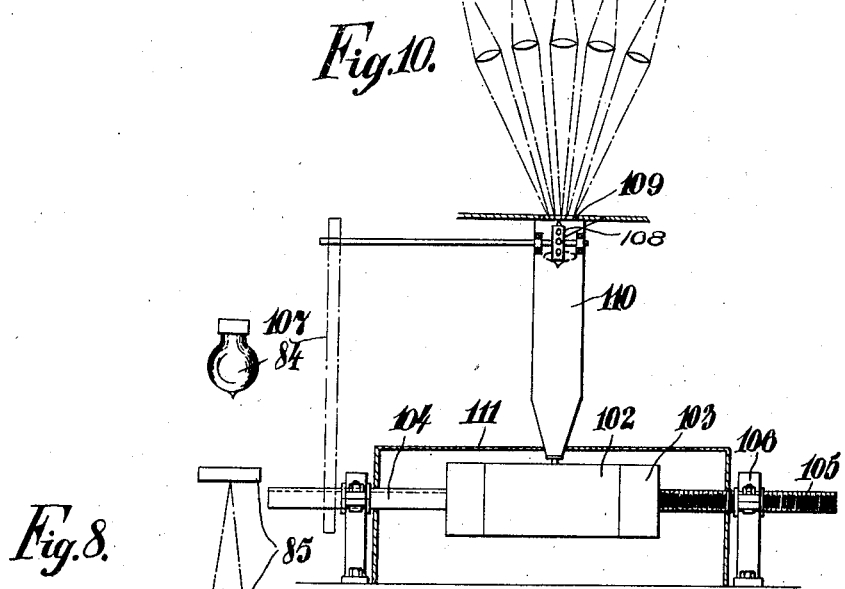
Inventors
H. Bartholomew
M. McFarlane
By Marker Clerk
Atty's Dec. 20, 1927.  1,653,425
H. G. BARTHOLOMEW ET AL
TELAUTOGRAPHY
Filed July 3, 1922  6 Sheets-Sheet 6
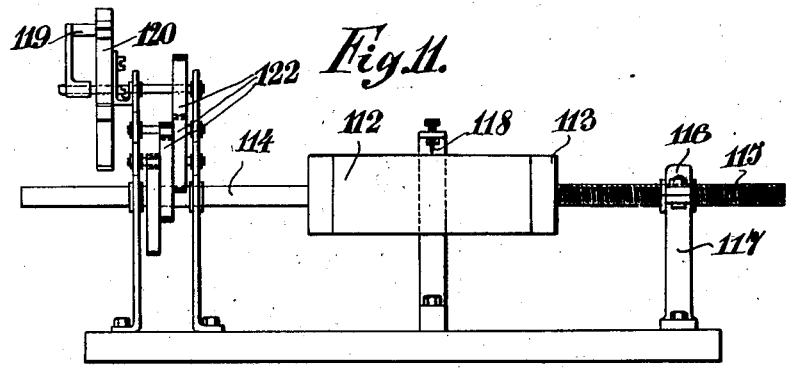
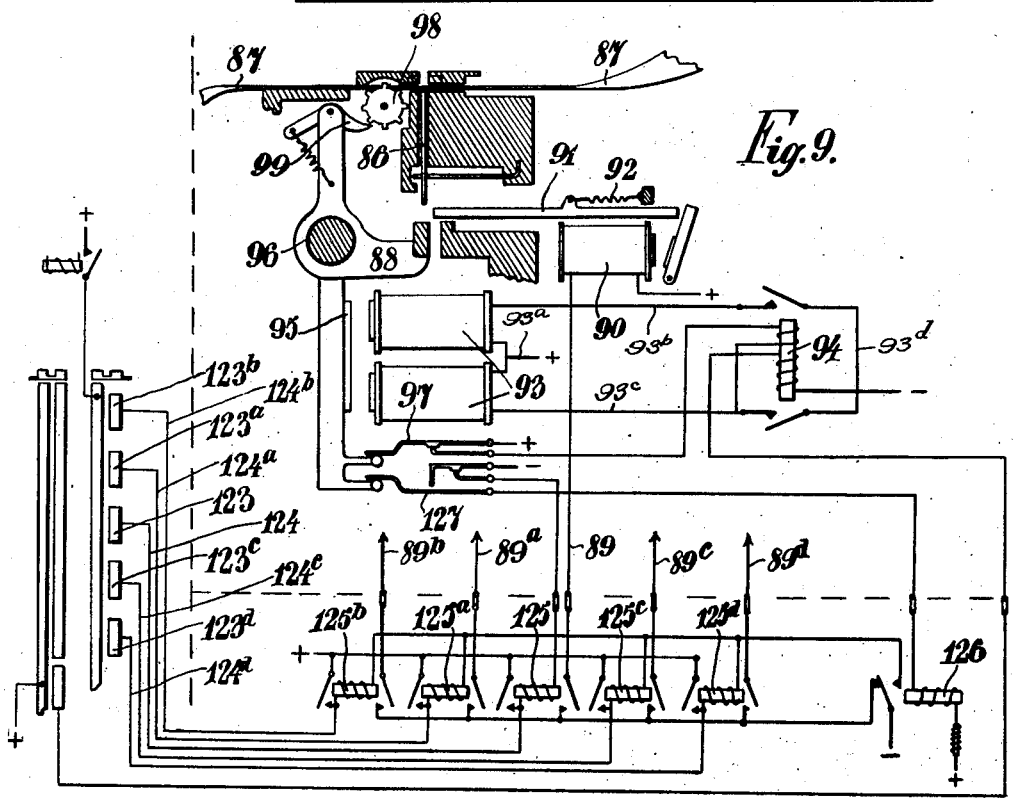

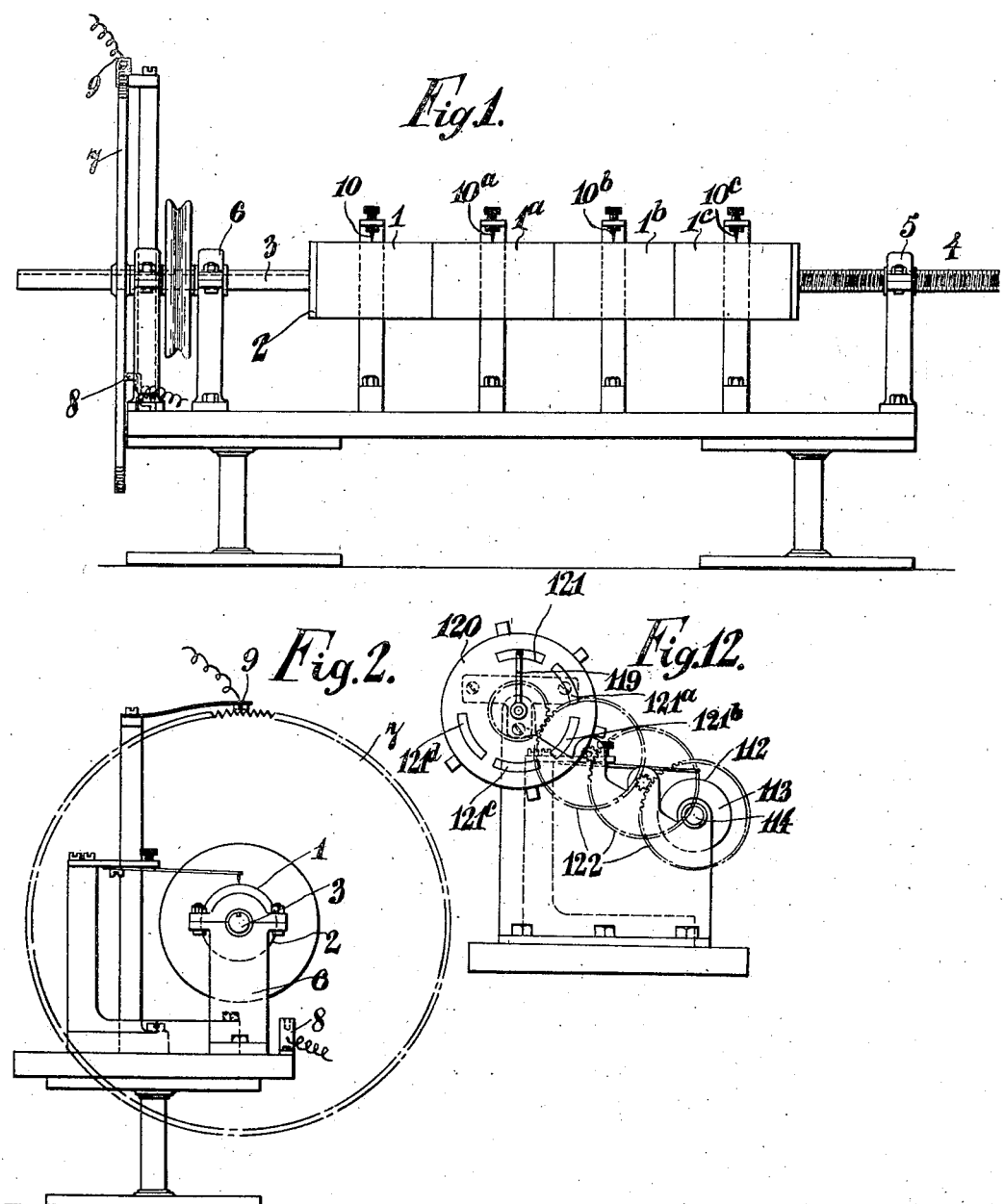

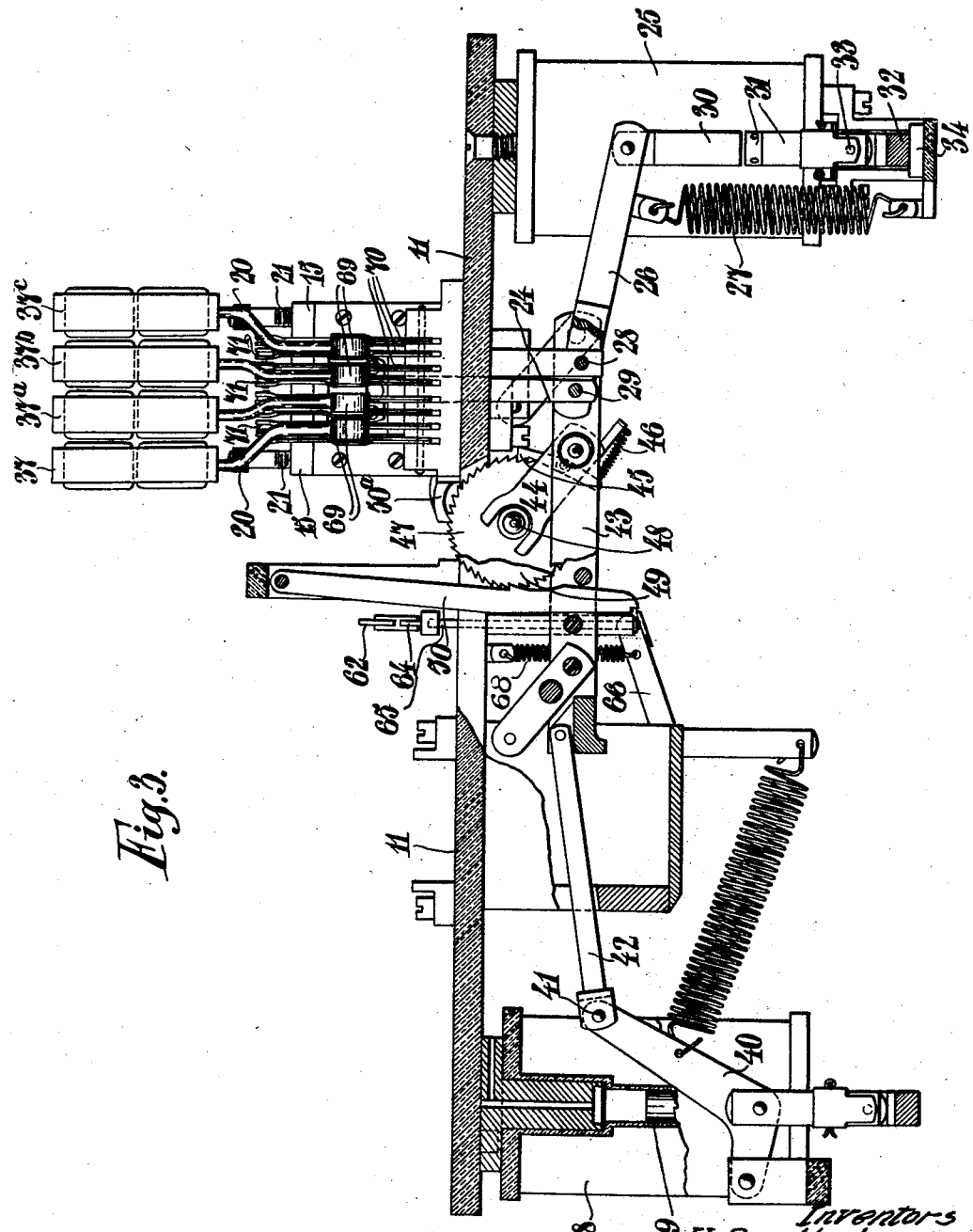

Patented Dec. 20, 1927.

1,653,425

UNITED STATES PATENT OFFICE.

HARRY GUY BARTHOLOMEW AND MAYNARD LESLIE DEEDES McFARLANE, OF LONDON, ENGLAND.

TELAUTOGRAPHY.

REISSUED

Application filed July 3, 1922, Serial No. 572,664, and in Great Britain September 19, 1921.

This invention relates to phototelegraphy.

The main objection to known processes of telautography or phototelegraphy is due to the time occupied in coding the transmission of the coded message and in decoding.

By "coding" in the preceding paragraph is meant the utilization of personal judgment in translating tone values into conventional indications by visual analysis of the several small areas of which the original is composed and representing the tones by letters or series or combinations of dots, perforations or other signs.

The object of the present invention stated broadly is to form without the intervention of personal judgment, an intermediate record in the form of a marked tape or band adapted to be employed in the operation of an automatic telegraphic transmitting machine or to be formed by an automatic telegraphic receiving machine.

Preferably, the marked tape is of a character adapted to be produced by or employed in the automatic control of standard telegraphic machines, and ordinarily the tape or band will be marked by punching or perforating means operated according to variations in an electric current controlled by a representation of the image to be transmitted.

This representation may be formed in any suitable manner, such as by a photographic representation on a plate of conducting material, by a record formed in plastic material, by reflective areas formed on an otherwise nonreflective surface or other suitable means.

A further object of the invention is to provide an improved method of securing the desired gradation, which method may be applicable to other processes of phototelegraphy than that described in the foregoing as well as to other purposes.

This phase of the invention comprises forming a plurality of representations from the original, differing one from the other in that they each correspond to given fractions of the tones or ranges of tone in the original.

Thus one representation may comprise only the deepest tones or full shadows of the original, a second may include only the next lighter tones or both these tones and the full shadows, a third including still lighter tones, and so on.

Four or five of such representations will usually be found sufficient, and by their aid a composite reproduction on a single surface is made at the receiving station in order to provide a final result which shall agree sufficiently for most practical purposes with the gradation in the original.

When employing these representations for the purposes of phototelegraphy they may be transmitted in succession so that a reproduction of each of them is secured at the receiving station and then with the aid of these reproductions as, for instance, by a plurality of printing operations, photographic or otherwise, a composite result comprising the several representations substantially in register may be obtained. This reproduction as above indicated, will have the desired degree of gradation.

This feature of the invention is not limited in utility to the method of phototelegraphy involving the communication from the transmitting to the receiving station of control signals and is perhaps of use in other fields than phototelegraphy and it is not the intention at present to limit the scope of the protection to any particular field.

A still further feature of the invention is based upon the observation that it is unnecessary to advance the light sensitive surface in a stepwise manner in relation to a source of light adapted to operate upon successive areas of the said surface to produce a pictorial representation from an intermediate record.

According to this feature of the invention the light sensitive surface and an intermediate record on which in equal lengths of travel the tone values of equal areas are recorded are caused to travel continuously or uninterruptedly.

The following particulars are given by way of example to illustrate in detail suitable methods of carrying the invention into effect and the means employed therefor, reference being had to the accompanying drawings, in which:—

Figure 1 is a front elevation, and

Figure 2 is a side elevation of a device adapted to operate on a plurality of representations in forming an intermediate record as described in Example 1.

Figure 3 is an elevation partly in section of a perforator adapted to form an intermediate record in the form of a punched tape when its operation is, for instance, controlled by the device illustrated by the preceding figures, and in the manner described in Example I.

Figure 4 is a view in elevation partly in section in a vertical plane at right angles to the plane of Figure 3, illustrating a portion of this device.

Figure 5 is a detail thereof.

Figure 6 is a view of another detail, and

Figure 7 is a diagram illustrating the electrical connections of the apparatus.

Figure 8 illustrates the device employed in forming the visual reproduction when controlled by the tape.

Figure 9 illustrates diagrammatically the machine known as the 6^A machine perforator of the Western Electric Company with an accessory device known as the relay box associated therewith. This machine, to which no claim is made herein, is adapted to form a punched tape of the 5 unit code type and may be controlled in accordance with the invention to produce an intermediate record, for instance as described in Examples II, III, and IV.

Figure 10 is a view in elevation of an apparatus for forming a visual reproduction by the employment of a tape such as may be produced in a machine as illustrated in Figure 9.

Figure 11 is a front elevation and

Figure 12 is a side elevation of an apparatus adapted for use in forming an intermediate record from a "half-tone" or like screen representation of the original.

*Example I.*

In this example a plurality of representations (four will be referred to although more may be used) formed from the original, each representation corresponding with a particular range of tones, is employed and an intermediate record is formed on a transmitting tape.

The four representations, 1, $1^a$, $1^b$, and $1^c$ (see Figures 1 and 2) are formed on a thin zinc plate by coating the same with gum and sensitizing in the manner usual in forming gum bichromate prints or in forming a photo-print on a metal plate which is subsequently subjected to an etching process. The developed and dried prints are then baked and mounted on a mandrel 2 secured to a spindle 3, the portion of which extending beyond one end of the mandrel is provided with a lead screw 4 operating in a fixed nut 5 in order to cause the mandrel to travel in an axial direction, the other end of the spindle being mounted in a suitable bearing 6.

The spindle is connected with the portion of the device adapted to produce the intermediate record which imparts to the record receiving material (in this case a paper tape) its feed motion. The connection may be mechanical but in the construction illustrated it is electrical, a commutator in the form of a toothed wheel 7 being mounted on the spindle, brushes 8 contacting with the same and making a continuous electrical connection with a source of current and a second brush 9 operating on the points of the teeth only and making an electric connection periodically in order to operate that portion of the device adapted to produce the intermediate record to be subsequently described which imparts motion to the record-receiving material. The four representations are caused to travel relatively to four styles or reader members 10, $10^a$, $10^b$, $10^c$ resiliently mounted and adapted to make an electrical connection through the metal plate on which the representations are formed with the devices adapted to form on the record-receiving material the marks indicating the combined tone values of the representations.

The perforator, the employment of which in forming the intermediate record will be described, resembles generally a known device, the Gell perforator, from which, however, it differs in that it does not necessarily comprise means for converting letters and numerals into combinations of punched holes and in that it does not, when used for phototelegraphy ordinarily vary the feed of the tape according to the number or arrangement of marking holes formed therein.

With regard to this portion of the device we may say that we have employed the construction described mainly because the several parts thereof were available to us and were readily adapted for the purpose in view.

The device (see Figures 3 to 7) comprises a casing 11 enclosing a portion of the mechanism, the top of the casing serving as a platform or support for numerous elements including three banks or punches. 12, $12^a$ and $12^b$, the bank 12 are carried by the slider 22 reciprocating therewith and operating as spacing punches adapted to form the feed holes in the tape and the second bank $12^a$ the marking holes, and the third bank $12^b$ operating to form a row of holes which is merely necessary to enable the tape to be employed in the operation of a Wheatstone transmitter, and to enable a corresponding tape to be produced at the receiving station by a Creed or other suitable reperforator; the punches are provided with a punch base 13, side guides 14, top plate 15 and bottom guide plate 16, a distance piece 17 introduced between the bottom guide plate and the cutting die 18; a check stop plate 19 is provided to limit the upward travel of the punches by limitation of the upward motion of the slider 22 secured by trunnions 23 to the pitman 24 which are drawn down under the action of the pair of perforating solenoids 25 within which cores are arranged to move the perforating lever 26 in opposition to the spring 27 about the pivot 28 whereby the pitmen secured to the lever through pins 29 are operated, the lever being connected by the connecting rod 30 provided with adjusting members 31 with the yoke 32 connecting the cores through the intermediary of pins 33, a rubber cushion 34 being provided for taking up shocks for the reduction of which spiral springs are also provided.

Each marking punch is provided with a slot 35 and is free in the slider except when engaged by the associated interlocking bar 36 and will only be moved as the result of the motion of the slider when so engaged.

The interlocking bars, of which it has been found convenient to utilize eight when the pictorial representation is divided into four components, are operated by four electromagnets 37, 37$^a$, 37$^b$, 37$^c$, two bars by each electromagnet which is energized by the passage of current through the metal on which the representation is formed and the associated style and conductors. Thus, when in all four components of the representation bare metal contacts with the four styles, all four electromagnets will be energized and all of the eight punches will be locked to the slider and will move down with it under the action of the perforating solenoids.

The feeding solenoid 38 operates upon a core 39 which is connected through the bell-crank lever 40 and the pin 41 and connecting arm 42 with the oscillating arm 43 which operates the active radial arm 44 with which is associated the active click 45 and active click spring 46 and in the motion of the oscillating arm to the left under the action of the solenoid the active click moves idly over the ratchet wheel 47 mounted on the main feed shaft 48 on which also is mounted the tape feed sprocket (not shown) provided with teeth engaging the holes formed in the tape by the central bank of punches. Return motion of the oscillating arm to the right feeds the tape forward, a check ratchet wheel 49 associated with a check ratchet 50 operating to prevent overrunning. The movement of the oscillating arm to the left is effected by the action of the feeding solenoid and is limited to secure a constant throw or feed of the tape of, say, six or seven holes, the spring retracting the oscillating arm to the right and moving the feed wheel as permitted by the spring controlled pawl 50$^a$.

The commutator 7 described operates to intermittently energize a solenoid 51 the core of which is connected to the yoke 52 which is drawn up in opposition to the spring 53 and operates through the rod 54 and insulating roller 55 the key 56 to cause the contacts 57, 57$^a$ thereon to make contact in succession with the contact screws 58, 58$^a$, thereby completing, see Fig. 7, first the circuit through the feed solenoid 38 by way of 58$^b$, 58$^c$, 58$^d$, 58$^e$, 58$^f$, 58$^g$ and then through the perforating solenoid 25 by way of 58$^h$, 58$^j$, 58$^k$, 58$^l$, 58$^g$, thus operating the perforating punches. The key is connected by flexible connections 59 with the cock 60 which, as illustrated in Figure 7, is in electrical connection with the set of terminals 61. One end of the lever 62 pivoted at 63 bears on the roller associated with the key, the other end bearing through the roller 64 on the head of the rod 65. On motion of the lever about its pivot under the action of the solenoid associated therewith, the rod will be moved in a vertical direction and when moved downwards it will cause the member 66 to move about the pivot 67 in opposition to the springs 68, thus freeing on the extension of the check ratchet. When on the other hand the member in question is retracted by the springs it will lock the check ratchet in position on completion of the travel of the oscillating bar to the right.

The perforating solenoid operates the marking punches which have been selected by the operation of the electromagnets connected to the styles. The selection of the punches is effected by the inward motion of the hammers 69 bearing upon the levers 70 connected by rods 71 to the levers 72. These levers in turn are connected through rods 73 and levers 74 with the selector bars 36 operating in association with the opposite marking punches.

The operation of the hammers and thus the selection of the punches results from the completion of the electric circuits in which are arranged their associated electromagnets in the manner above described.

The transmitting tape produced in this manner is then employed for controlling a transmitter at one end of a telegraph or telephone circuit thereby operating a receiving mechanism in order to reproduce the representation.

The transmitting tape may, for instance, be used in controlling a transmitter and operating a reperforator of the Creed or other suitable type at the receiving station in order to produce a corresponding tape, such tape being then used in forming a visual representation of the original, as for instance by moving a light sensitive surface in a continuous manner in relation to means whereby successive small areas of the same may be exposed to the action of light, the exposure of said areas being varied in respect of duration or intensity of light action, by means of the tape.

This may be effected by the employment of apparatus of the character indicated in the specification of British Letters Patent No. 1,812 of 1920.

Alternatively, the tape may be employed in controlling an apparatus in which the tape and light sensitive surface are moved continuously.

The apparatus may for instance comprise (see Figure 8) a cylindrical mandrel 75 about which the light sensitive surface is wrapped, the mandrel being arranged under a cover 76 in relation to a projector 77 adapted to project a spot of light onto the light sensitive surface in such manner that the spot of light will trace a helical path on the said surface, and means 78 adapted to cause the tape 79 to travel at a speed bearing an appropriate relation with the speed of travel of the light sensitive surface in relation to the means adapted to illuminate the same, and control the exposure thereof.

The tape, to this end, is caused to travel between guides 80 over an aperture 81 in the platform 82, being pressed against the same by the block 83 which is also perforated to permit a beam of light from the lamp 84 passing through the lens system 85 to fall upon the tape in such manner that the marking holes in the tape, of which only one row need be employed for this purpose, will permit the light to pass through the projector on to the light sensitive surface while the portion of the tape intervening between adjacent holes will intercept the light.

Presuming that a result comparable with that obtained by a 50 line screen is to be produced and the circumference of the light sensitive surface supported on the mandrel is four inches, the tape should be moved at such a speed that approximately one section will control the exposure of 1/50th of a linear inch of the circumference. In other words the mandrel will make 1/200th or preferably 2/401sts of a turn, while one section of the tape is passing, the speed of travel of the tape relatively to the speed of rotation of the mandrel in making the record being similarly regulated to secure an advance of the latter of 1/200th but preferably 2/401sts of a turn for each section of tape.

*Example II.*

In accordance with this mode of carrying the invention into effect a tape, each unit of which consists of holes arranged transversely to the direction of travel of the tape, and in this respect resembling a tape punched on the five unit code, is used in making the record.

The plurality of representations are operated on by styles which are arranged to make connection through the mandrel, as in the preceding example, with means adapted to select appropriate punches.

The perforator illustrated diagrammatically in Figure 9 generally resembles the 6^A machine perforator of the Western Electric Company and it is to be understood that no claim is made to this construction except in so far as it may be modified for use in the process of telautography or photo-telegraphy according to the invention.

The perforator comprises six punches of which one 86 is seen in the figure arranged at right angles to the direction of travel of the tape 87, one punch, not shown, being longer than the others and being operated upon by the hammer 88 at each stroke to form feed holes and one or more of the other punches being operated by the same hammer when current passes through one or more of the styles and its associated circuits to form marking holes.

The action of the parts to obtain the staggered effect may be described as follows:

The commutator by suitable gearing is caused to operate the punches 200-1/2 times in each revolution of the mandrel on which the picture is mounted, therefore on the completion of one revolution a narrow strip of the picture on the mandrel has been read, that is, recorded at intervals, 200 times. For simplicity it will be considered that a picture 4″ long is thus divided into 200 divisions each 1/50 of an inch long. On the second revolution owing to the fact that the punches are not operated till the mandrel has revolved a further 1/2 of a 1/200 (or 1/400) of a revolution, the point in the same lateral line as that first rendered is not read, the first stroke of the punch on the second revolution of the mandrel recording a point in the picture 1/2 of a division behind that point, the area represented by this perforation being intermediate those represented by points on the same line in the zones on either side. On the next or third revolution the punch is again operated as a point in the same lateral line as that first read is passing under the style and therefore the punch records this point in the tape as in the same relative position as that first read.

Each reading for each representation corresponds to the area of a stylus point. On the second revolution of the mandrel the punches are operated before each stylus reaches a point corresponding to that point in the first narrow strip at which the punches were given their first actuations. Hence upon the completion of the second revolution of the mandrel, the tape has been given 201 feeding impulses, and the punches have operated 201 times to form records of 201 points of the second narrow strip, each point on the second narrow strip thus recorded being half-way between the imaginary lines on which the two adjacent points of the first zone are located.

The tape formed in this way may operate a transmitting device and a device adapted at the receiving end to form a similar tape which is then employed in controlling a device adapted to form a visual reproduction of the original. This device may generally resemble the device employed for the like purpose according to Example I, being, however, provided with a plurality of illuminating devices 100, 100$^a$, 100$^b$, 100$^c$ and 100$^d$ (see Figure 10) the light from each of which is directed by means of the lens system 101, 101$^a$, 101$^b$, 101$^c$, 101$^d$, and is controlled by a marking hole arranged at a particular distance from the edge of the tape and the rays permitted to pass by all of the holes are concentrated or directed to form a single spot of light on the light sensitive surface.

This spot will be formed by rays of light from four sources, if there are four marking holes in a line at right angles to the direction of travel of the tape, or from three, two or one sources if there are three, two or one holes the light being completely cut off if there is no marking holes in the tape corresponding with a feed hole, and will be projected on to the light sensitive surface 102 wrapped about the mandrel 103 mounted on a spindle 104, one end of which is formed as a lead screw 105 operating in the nut 106 adapted to cause the mandrel to travel axially as well as radially, the spindle operating through suitable gearing 107, the tape feed-sprocket 108 causing the same to travel over the platform or diaphragm 109 in which a slot is formed with which the holes in the tape will register and permit light to pass through to the projecting lenses mounted in the tube 110 and on to the light sensitive surface which is mounted on the light-tight cover 111.

*Example III.*

According to this example, a half tone or line screen reproduction 112 formed of conductive material is mounted on a mandrel 113 secured to a spindle 114, one end of which is formed as a lead screw 115 and operates on a nut 116, formed on the standard 117, is operated upon by a single style or reader-member 118 (see Figures 11 and 12) the reproduction being moved relatively to the style through the intermediary of the means referred to.

The surface of this reproduction is of course composed of upstanding dots of various sizes according to the depth of tone represented.

The style or reader member is connected to a brush 119 which moves over a commutator 120 comprising as many contact pieces 121, 121$^a$, 121$^b$, 121$^c$, 121$^d$ as the total number of tones required to be represented.

If five punches are employed for forming the holes corresponding with the deepest tone there will be five contact pieces on the commutator, each of which with one intervening nonconducting portion will be of such length as to occupy 60° of the face of the commutator or some other fraction depending on the method used in the production of the half tone original and on the ratio of the sizes of the dots to the tones in the original picture (this ratio being in the nature of $n \times \dfrac{b-a}{5}$ when $b$ is the size of the largest dot, and $a$ of the smallest dot, and $n$ is a constant to be determined by the method used in the preparation of the half tone dependent on the speed of the plate and the duration and intensity of the exposure). There will also be a non-conducting portion of the commutator of proportionate length between one pair of contact pieces.

The commutator brush is operated by means of gearing 122 from the mandrel spindle at an appropriate speed, that is to say, at a speed which is so related to the speed of rotation of the mandrel that the brush will contact successively with the five segments in passing over a dot of the maximum size or corresponding with the maximum depth of tone.

The code produced by this form of the invention will therefore be in the form of a series of groups of perforations consisting of from one to five holes, each group extending transversely to the length of the tape.

Means are provided similar to that described in the preceding examples for operating the punches or groups of punches selected in the manner described above.

The device operating upon the representation can conveniently be connected with the device known as the 6$^A$ machine perforator of the Western Electric Company, the contact pieces on the commutator being connected to the conductors connected with the selector magnets.

*Example IV.*

According to this example, a 6$^A$ machine perforator of the Western Electric Company is used and a half-tone representation is operated upon by a device similar to that described in the preceding example except that the commutator associated with the mandrel is connected to the relay box ordinarily associated with the 6$^A$ machine perforator of the Western Electric Company.

In this case on the brush associated with the commutator making contact with the segments 123, 123$^a$, 123$^b$, 123$^c$, 123$^d$ current is passed by conductors 124, 124$^a$, 124$^b$, 124$^c$, 124$^d$ to relays 125, 125$^a$, 125$^b$, 125$^c$, 125$^d$ which when energized by the current from their appropriate segments close the circuits through their respective selecting magnets, one of which, 90, only is illustrated in Figure 9, and also close local circuits which maintain the relays in operation until this local circuit is broken by the "overlap" relay 126. The object of this overlap relay is to prevent the magnets 90 being de-energized, and thus the rods 91 being withdrawn by the springs 92 before the action of punching has taken place. On the movement of the armature 95 operating the punch hammer 88, contact is made by the spring switch 127 and the relay 126 energized. This breaks the local circuits in which are the relays 89, 89ª, etc., and places them in a state suitable for the reception of further impulses from the segments.

It is to be understood that the various specific embodiments described are not to be regarded as delimiting the scope of the invention but as illustrative only. For instance the word "picture" is used to designate either an actual picture of a suitable nature or a reproduction or plurality of reproductions thereof as described in the foregoing specification and also includes written or printed messages. The scope of the invention is clearly defined by the appended claims.

We claim—

1. In an apparatus for transmitting a representation such as a picture or the like, a support for said representation of electrically conductive material, reader means adapted to travel over the surface of said representation, means adapted to move said representation and reader means respectively to each other, a source of electric current connected to said support and to said reader means, automatic recording mechanism comprising a plurality of marking means adapted to form an intermediate record which is not a visual equivalent of said representation, the number of said marking means brought into operation at each marking movement being dependent upon the current flowing from said source as determined by the association of the support for the representation and the reader means.

2. In an apparatus for transmitting a representation such as a picture or the like, as claimed in claim 1, feeding means acting to move the material on which the intermediate record is formed past the plurality of marking means, said feeding means acting to advance the tape in an intermittent manner.

3. An apparatus for transmitting a representation such as a picture or the like, having a support adapted to hold a representation, reader means, automatic record forming mechanism associated with the said reader means, and means to produce relative movement between the said support and the said reader means, in which the said record forming mechanism comprises perforating mechanism which includes a number of separately operable punches adapted to perforate a record tape, the association of said reader means with each of a plurality of small areas of the representation to be transmitted being adapted to cause the selection of the punches which are to operate upon said tape, and means for intermittently moving said tape past said punches.

4. In an apparatus for transmitting a representation such as a picture or the like, a support adapted to carry the said representation, reader means associated with the said support and adapted to be associated with the picture or the like carried on the said support, and aiding in rendering the tone values of said picture, means adapted to produce a relative movement between the said support and the said reader means whereby the said reader means are caused to move over the consecutive small areas of a picture carried on the said support, automatic perforating mechanism comprising a series of individually operable punches adapted to perforate a record tape, feeding means adapted to feed said tape with a continuous step by step movement past said punches and independent of the operation thereof and control means for said punches associated with the said reader means and operable according to the tone value of the small area of said picture in association with the said reader means, the said control means being adapted to control the selection of the said punches which are operative on the successive zones of the said tape.

5. A device according to claim 3 comprising a support adapted to carry a plurality of representations of a picture or the like, each said representation corresponding to a predetermined depth of tone of each said picture, and in a separate reader means associated with each representation.

6. An apparatus according to claim 3 comprising a support adapted to carry a series of representations of a picture or the like formed on electric conductive material, each said representation corresponding to a predetermined depth of tone of said picture or the like, and separate reader means associated with each representation.

7. Apparatus for use in photo-telegraphy comprising a half tone screen representation of electrically conductive material, the surface of which is composed of conductive dots of sizes varying with the depth of tone represented, a spindle around which said representation is mounted, means for rotating said spindle and simultaneously feeding same longitudinally, reader means adjusted to contact with the tops of said raised dots, perforator means comprising a number of punches connected with the segments of a commutator, a commutator brush connected to said reader means and serving to complete an electrical circuit during the passage of the reader across a dot and thus to cause the operation of said punches, the number brought into operation depending upon the size of said dot.

8. Apparatus for use in photo-telegraphy comprising a half tone representation the surface of which is composed of raised dots, reader means adapted to contact with the tops of said raised dots, means for causing said means to travel over the surface of said representation, perforator means comprising a number of punches, and a strip of material moved relatively to said perforator means, said reader means operating according to the tone value of successive small areas of the representation to select a larger or smaller number of punches to operate upon said strip.

9. Apparatus for use in photo-telegraphy comprising a spindle adapted to be rotated and simultaneously fed longitudinally, a representation to be transmitted mounted upon said spindle, said representation being formed on electrically conductive material, reader means bearing upon the surface of said representation and mounted in blocks fitting freely in a bearing member serving to accurately retain the reader members in adjusted position, perforator means arranged to be operated according to the electric current passed by said reader means and representation, a tape adapted for use in standard machines intermittently fed past said perforating machines at a rate bearing a predetermined ratio to the speed of revolution of said shaft, and means controlled by said punched tape for producing a visual reproduction of the representation transmitted.

10. Apparatus for use in photo-telegraphy comprising a spindle adapted to be rotated and simultaneously fed longitudinally, a plurality of representations to be transmitted mounted upon said spindle, said representations being formed on electrically conductive material, reader means bearing upon the surface of said representations and mounted in blocks fitting freely in a bearing member serving to accurately retain the reader members in adjusted position, perforator means arranged to be operated according to the electric current passed by said reader means and representation, a tape adapted for use in standard machines fed past said perforating machines at a rate bearing a predetermined ratio to the speed of revolution of said shaft, and means controlled by said punched tape for producing a visual reproduction of the representation transmitted.

11. A method of reproducing a representation such as a picture or the like, which consists in forming a non-pictorial intermediate record of said representation by marking said record with a series of markings adapted to modify light falling upon said record varying according to the tone values of small areas thereof, and then varying the intensity of light acting upon a light sensitive surface according to said markings so that said light produces upon said light-sensitive surface substantial duplicates of said original small areas.

12. In the art of transmitting a representation such as a picture or the like, those steps which consist in forming an intermediate non-pictorial record of the tone values of small areas of successive narrow zones of the picture the said record comprising equally spaced markings arranged in series and adapted to modify light falling upon said record, each said series corresponding to one of said narrow zones, the markings in alternate series being more numerous than the markings in the other series.

13. A non-pictorial record of a representation such as a picture or the like, in the form of a perforated tape having a plurality of perforations arranged in successive series, the number of perforations in each series varying in number according to the varying tone values of corresponding small areas of said picture.

14. A non-pictorial record of a representation such as a picture or the like, as claimed in claim 13 in which said perforated tape is of the form used in the automatic control of standard machines.

15. A non-pictorial composite record of a plurality of separate representations of a picture, each said representation corresponding to a given range of tone of said picture, said record comprising a plurality of discontinuous series of markings arranged in groups, each said series corresponding to one of said representations and the tone value corresponding thereto, each said group corresponding to the composite tone value of said representations at corresponding small areas thereof, so that the presence or absence of any said tone value at any said area is indicated by the presence or absence of the marking in the corresponding series in the said corresponding group of markings.

16. A method of automatically forming a non-pictorial representation which is not the visual equivalent of the original of a half-tone picture or the like, which consists in forming upon a strip of material a series of non-pictorial and sharply defined markings comprising a plurality of successive elements, the said elements corresponding to successive small zones of the said half-tone picture or the like, the area of each of said elements corresponding to the tone values of the respective small areas of the said picture, the areas comprised by the said successive elements having different electrical conductive properties than the portions of the strip intermediate the said elements.

17. A method according to claim 17 in which the said marking elements comprise sharply defined perforations.

18. A non-pictorial record which is not the visual equivalent of the original of a half-tone picture or the like, comprising a strip having a series of non-pictorial and sharply defined markings thereon, the said series comprising a succession of elements each of which corresponds to a small zone of the said picture or the like, the area of each said element corresponding to the tone value of the said zone, the areas occupied by the said elements having different electrical conductive properties than the portions of the said strip intermediate the said elements.

In testimony whereof we have signed our names to this specification.

HARRY GUY BARTHOLOMEW.
MAYNARD LESLIE DEEDES McFARLANE.